(12) United States Patent
Takeuchi et al.

(10) Patent No.: US 7,820,328 B1
(45) Date of Patent: Oct. 26, 2010

(54) ELECTROCHEMICAL CELL ELECTRODE WITH IMPROVED PARTICLE-TO-PARTICLE CONTACT AND METHOD OF MANUFACTURING

(75) Inventors: Esther S. Takeuchi, East Amherst, NY (US); Amy C. Marschilok, Clarence, NY (US); Randolph Leising, Williamsville, NY (US)

(73) Assignee: Greatbatch Ltd., Clarence, NY (US)

( * ) Notice: Subject to any disclaimer, the term of this patent is extended or adjusted under 35 U.S.C. 154(b) by 641 days.

(21) Appl. No.: 11/829,229

(22) Filed: Jul. 27, 2007

Related U.S. Application Data

(60) Provisional application No. 60/820,489, filed on Jul. 27, 2006.

(51) Int. Cl.
*H01M 4/62* (2006.01)
*H01M 4/02* (2006.01)
*C08J 9/26* (2006.01)

(52) U.S. Cl. .................. 429/232; 264/45.1; 264/49; 29/623.1

(58) Field of Classification Search .................. 264/44, 264/45.1, 49; 429/232; 29/623.1
See application file for complete search history.

(56) References Cited

U.S. PATENT DOCUMENTS

| | | | |
|---|---|---|---|
| 4,310,609 A | 1/1982 | Liang et al. | |
| 4,320,184 A * | 3/1982 | Bernstein et al. | 264/49 X |
| RE33,306 E * | 8/1990 | Hayashi et al. | 429/232 X |
| 5,472,810 A | 12/1995 | Takeuchi et al. | |
| 5,516,340 A | 5/1996 | Takeuchi et al. | |
| 5,965,296 A * | 10/1999 | Nishimura et al. | 429/232 X |
| 6,171,726 B1 | 1/2001 | Reichman et al. | |
| 6,224,990 B1 | 5/2001 | Hahn et al. | |
| 6,315,808 B1 | 11/2001 | Moore et al. | |
| 6,319,459 B1 | 11/2001 | Melody et al. | |
| 6,375,710 B2 | 4/2002 | Moore et al. | |
| 6,423,447 B1 | 7/2002 | Ohsaki et al. | |
| 6,551,747 B1 | 4/2003 | Gan | |
| 6,639,787 B2 | 10/2003 | Kimmel et al. | |
| 6,713,214 B2 | 3/2004 | Koga et al. | |
| 6,746,804 B2 | 6/2004 | Takeuchi et al. | |
| 6,783,894 B2 * | 8/2004 | Kajiura et al. | 264/44 X |
| 2002/0090550 A1 | 7/2002 | Koga et al. | |
| 2002/0114722 A1 | 8/2002 | Kimmel et al. | |
| 2002/0172861 A1 | 11/2002 | Kimmel et al. | |
| 2004/0040415 A1 | 3/2004 | Kimmel et al. | |
| 2004/0062991 A1 | 4/2004 | Fukui et al. | |
| 2005/0244711 A1 | 11/2005 | Fukui et al. | |

OTHER PUBLICATIONS

Thermal Decomposition Behaviour of Poly(Propylene Carbonate) Hongwen Yan, W. Roger Cannon & Daniel J. Shanefield, Ceramics International 24 (1998) 433-439.

* cited by examiner

*Primary Examiner*—Stephen J. Kalafut
(74) *Attorney, Agent, or Firm*—Michael F. Scalise

(57) ABSTRACT

An electrochemical cell comprising an electrode, whether it is the cathode of a primary cell or an anode or a cathode of a secondary cell, comprised of a mixture of a robust, high temperature binder along with a sacrificial decomposable polymer is described. The robust binder remains in the electrode throughout formation and processing, and maintains adhesion and cohesion of the cathode during utilization. The sacrificial decomposable polymer is present during the electrode formation stage. However, it is decomposed via a controlled treatment prior to electrode utilization. Upon subsequent high pressure pressing, the void spaces formerly occupied by the sacrificial polymer provides sites where the electrode active material collapses into a tightly compressed mass with enhanced particle-to-particle contact between the active material particles. For a cathode in a primary cell, for example a Li/SVO cell, the result is believed to be improved rate capability, capacity and stability throughout discharge.

29 Claims, No Drawings

ELECTROCHEMICAL CELL ELECTRODE WITH IMPROVED PARTICLE-TO-PARTICLE CONTACT AND METHOD OF MANUFACTURING

CROSS-REFERENCE TO RELATED APPLICATION

The present application claims priority from application Ser. No. 60/820,489, filed Jul. 27, 2006.

BACKGROUND OF THE INVENTION

The present invention relates generally to electrochemical cells, and methods for manufacturing electrochemical cells. The electrode can be of either a primary or a secondary chemistry. More particularly, this invention relates to improved electrodes for lithium and lithium-ion electrochemical cells. Specifically, a cathode for a primary cell is prepared utilizing a mixture that incorporates a robust high temperature binder such as PTFE and a sacrificial decomposable polymer such as a polycarbonate mixed with a high rate electroactive material such as silver vanadium oxide. Prior to incorporation into the cell, the electrode is heated to a temperature below the decomposition temperature of the robust binder, but above that of the decomposable polymer. Removal of the latter provides void spaces in the electrode structure. A subsequent pressing step causes the active mass to collapse at the void sites to enhance particle-to-particle contact within the electrode throughout discharge.

SUMMARY OF THE INVENTION

Electrochemical cells are widely used in a range of applications. Lithium cells are well known as power sources for implantable medical devices. Some examples of devices include pacemakers, defibrillators, neurostimulators, and drug delivery systems. Cell electrodes for many of these devices are manufactured by preparing a powdered mixture of an electrochemically active material with a binder and a conductive agent. The resulting mixture is then typically spread, coated, or pasted onto a thin metallic current collector. The resulting active admixture/current collector assembly is then pressed at high pressures to compress the active components to an optimum density from both a discharge performance and energy density standpoint.

However, it is believed that particle-to-particle contact between the active material particles can be further improved. In that respect, the present invention provides an electrode, whether it is the cathode of a primary cell or an anode or a cathode of a secondary cell, comprised of a mixture of a robust, high temperature binder along with a sacrificial decomposable polymer. The robust, high temperature binder can be selected from the group consisting of polytetrafluoroethylene (PTFE), polyvinylidene fluoride (PVDF), polyethylenetetrafluoroethylene, polyamides, and polyimides. This robust binder remains in the electrode throughout formation and processing, and maintains adhesion and cohesion of the cathode during utilization.

The sacrificial decomposable polymer is present during the electrode formation stage. However, it is decomposed via a controlled treatment prior to electrode utilization. The controlled treatment may include thermal treatment or UV irradiation in either an inert or oxidizing atmosphere. The controlled treatment conditions are carefully selected to ensure complete decomposition of the sacrificial polymer without degrading the other electrode components, including the active material, the robust binder and a conductive diluent, if present.

This provides an electrode active mixture with good structural integrity and enhanced particle-to-particle contact between the active material particles. For a cathode in a primary cell, for example a Li/SVO cell, the result is believed to be improved rate capability, capacity and stability throughout discharge.

These and other objects of the present invention will become increasingly more apparent to those skilled in the art by reference to the following description.

DETAILED DESCRIPTION OF THE PREFERRED EMBODIMENTS

Electrochemical cells of the present invention may be of either a primary chemistry, of a secondary, rechargeable chemistry. These cells possess sufficient energy density and discharge capacity required to meet the rigorous requirements of implantable medical devices. For both the primary and secondary types, the cell comprises an anode of lithium. An alternate anode comprises a lithium alloy for example, Li—Si, Li—Al, Li—B, Li—Mg and Li—Si—B alloys and intermetallic compounds. The greater the amounts of the secondary material present by weight in the alloy, however, the lower the energy density of the cell.

For a primary cell, the anode is a thin metal sheet or foil of the lithium material, pressed or rolled on a metallic anode current collector, i.e., preferably comprising titanium, titanium alloy or nickel. Copper, tungsten and tantalum are also suitable materials for the anode current collector. The anode current collector has an extended tab or lead contacted by a weld to a cell case of conductive metal in a case-negative electrical configuration. Alternatively, the anode may be formed in some other geometry, such as a bobbin shape, cylinder or pellet, to allow for a low surface cell design.

In secondary electrochemical systems, the anode or negative electrode comprises an anode material capable of intercalating and de-intercalating the lithium anode active material. A carbonaceous negative electrode comprising any of the various forms of carbon (e.g., coke, graphite, acetylene black, carbon black, glassy carbon, etc.) which are capable of reversibly retaining the lithium species is preferred for the anode material. A meso-carbon micro bead (MCMB) graphite material is particularly preferred due to its relatively high lithium-retention capacity and rapid charge/discharge rates.

A typical negative electrode for a secondary cell is fabricated by mixing about 85 to about 97 weight percent of the anode active material, for example MCMB, with about 3 to about 15 weight percent of a robust, relatively high temperature binder, about 1 to about 5 weight percent of a sacrificial polymer, and about 1 to about 10 weight percent of a conductive diluent.

The robust, high temperature binder is in a powdered form and is preferably a thermoplastic polymeric material. The term thermoplastic polymeric binder material is used in its broad sense and any polymeric material which is inert in the cell and that passes through a thermoplastic state, whether or not it finally sets or cures, is included within the term "thermoplastic polymer". Representative materials include polyethylene, polypropylene, polyamides, polyimides and fluoropolymers such as fluorinated ethylene, fluorinated propylene, polyvinylidene fluoride (PVDF), polytetrafluoroethylene (PTFE), and polyethylenetetrafluoroethylene (ETFE).

Other halogenated polymeric materials suitable as the robust, high temperature binder include fluorinated resins, for example, polyhexafluoropropylene, tetrafluoroethylene-hexafluoropropylene copolymers, tetrafluoroethylene-perfluoroalkyl vinyl ether copolymers, polytrifluoroethylene, ethylene-tetrafluoroethylene copolymers, fluoroethylene-hydrocarbon vinyl ether copolymers, polychlorotrifluoroethylene, ethylene-chlorotrifluoroethylene copolymers, polyvinyl fluoride, vinylidene fluoride-hexafluoropropylene copolymers, fluorinated (meth)acrylate resins, 2-fluoroacrylate resins, fluorinated epoxy resins, fluorinated epoxy (meth)acrylate resins, fluorinated polyether resins, fluorinated polyimide resins, fluorinated polyester resins, fluorinated polyamide resins, fluorinated polycarbonate resins, fluorinated polyformal resins, fluorinated polyketone resins, fluorinated polyazomethine resins, fluorinated polyazole resins, and fluorinated polyallyloxysilane resins. The binder can also be a fluorinated elastomer such as vinylidene fluoride-hexafluoropropylene fluoroelastomer, vinylidene fluoride-tetrafluoroethylene fluoroelastomer, tetrafluoroethylene-perfluoroalkyl vinyl ether fluoroelastomer, vinylidene fluoride-tetrafluoroethylenehexafluoropropylene fluoroelastomer, vinylidene fluoride-tetrafluoroethylene-perfluoroalkyl vinyl ether fluoroelastomer, tetrafluoroethylene-perfluoroalkyl vinyl ether fluoroelastomer, propylene-tetrafluoroethylene fluoroelastomer, fluorosilicone rubber, fluorinated phosphazene rubber, fluorinated thermoplastic rubbers, and flexible fluorocarbon resins. Natural rubbers are also useful as the binder material with the present invention.

Suitable sacrificial polymers are preferably in a powdered form and include ethyl cellulose, acrylic resin, polyvinyl alcohol, polyvinyl butyral and a poly(alkylene carbonate) having the general formula R—O—C(=O)—O with R=C1 to C5. Poly(ethylene carbonate) and poly(propylene carbonate) are preferred. Poly(alkylene carbonates) and the other sacrificial polymers burn out of the electrode admixture in both an inert atmosphere such as a vacuum, nitrogen, hydrogen, argon, and helium, or an oxidizing atmosphere such as air, oxygen, and steam. After burn-off of the poly(alkylene carbonates), only very small quantities of carbon (6.9 ppm per ASTM D482) are left. Suitable poly(alkylene carbonates) are commercially available from Empower Materials, Inc., Newark, Del. under the designations QPAC 25 and QPAC 40.

Suitable conductive diluents are in a powder form and include acetylene black, carbon black and graphite. Metals such as nickel, aluminum, titanium and stainless steel in powder form are also useful as conductive diluents.

The above-described binder/sacrificial polymer/conductive diluent mixture along with the carbonaceous anode active material can be dissolved or dispersed in a solvent to form a slurry, or they can be used in a dry powder form. Suitable solvents include water, methyl ethyl ketone, cyclohexanone, isophoron, N-methyl-2-pyrrolidone (NMP), N,N-dimethylformamide, N,N-dimethylacetamide, toluene, and mixtures thereof. The negative electrode admixture slurry or dry powder mixture is then provided on a current collector such as of nickel, stainless steel, or copper foil or screen by casting, pressing, rolling or otherwise contacting the admixture thereto. Less than 3 weight percent of the binder provides insufficient cohesiveness to the loosely agglomerated carbonaceous active material to prevent delamination and sloughing from the anode current collector and cracking during electrode preparation, cell fabrication and cell discharge. More than 15 weight percent of the binder provides a cell with diminished capacity and reduced current density due to lowered electrode active density.

Once the electrode active admixture is contacted to the anode current collector it is first pressed into intimate contact therewith and then heated to a temperature to, for all intents and purposes, decompose the sacrificial polymer. The decomposition temperature is about 220° C. for the previously described poly(ethylene carbonate) and about 250° C. for poly(propylene carbonate). Therefore, the minimum final heating temperature must exceed these temperatures to ensure complete combustion of the sacrificial polymer into non-toxic by-products, primarily carbon dioxide and water. Decomposition of poly(propylene carbonate) via thermal treatment in a nitrogen or air atmosphere has been reported by Yan, H., et al. *Ceramics International.* 24 (1998) 433-439. This decomposition reaction proceeds at a temperature of from about 220° C. to about 350° C. via the below depolymerization mechanism, leaving no detectable residues.

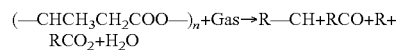

This means that for a poly(alkylene carbonate), a heating protocol of about 220° C. to about 350° C. for a period of about 30 minutes to about 2 hours is acceptable. A more preferred protocol is to heat the electrode at about 260° C. for about 1 hour. In any event, the heating temperature must be above the decomposition temperature of the sacrificial polymer, but below that of the binder. Secondary cell negative electrodes must be heated under an argon atmosphere to prevent oxidation of the copper current collector. After heating to decompose the sacrificial polymer, the electrode temperature is ramped down or cooled to ambient, maintained at the decomposition temperature to enhanced bonding strength, or varied according to a specific profile.

In one embodiment, the anode active mixture contacted to the current collector, but now devoid of the sacrificial polymer, is ready for incorporation into an electrochemical cell. The pore spaces created by decomposition of the sacrificial polymer serve to enhance power capability of the resulting cell. That is because the pores enhance intercalation of lithium ions into the anode active material, especially at interior regions of the electrode.

In another embodiment, the anode active mixture contacted to the current collector, but now devoid of the sacrificial polymer, is further calendared or otherwise compressed into a binding intimate contact with the anode current collector. This pressing is at a significantly greater pressure than that used to first contact the anode active admixture to the current collector. A pressure of about 5 tons/inch$^2$ to about 65 tons/inch$^2$, preferably about 30 tons/inch$^2$, is typical. This serves to compress the carbonaceous active material into a more densely compacted mass than is possible by manufacturing techniques known in the prior art. It is believed that when the sacrificial polymer is decomposed, it leaves behind void spaces in the carbonaceous active mass. Upon subsequent pressing, these void spaces serve as sights where the carbonaceous active mixture collapses into a more densely compressed mass. However, the active mixture must not be compressed so much that it becomes difficult for electrolyte to wet interior positions of the electrode, which is requires for an electrochemical reaction to take place. It is believed that for carbonaceous active materials the above pressures are sufficient to provide an electrode with improved energy density. The result is an anode with enhanced capacity in terms of a similar one that has not been subjected to a secondary pressing step.

In either a primary or secondary cell, the reaction at the positive electrode involves conversion of ions which migrate from the negative electrode to the positive electrode into atomic or molecular forms. For a primary cell, the cathode active material comprises a carbonaceous chemistry or at least a first transition metal chalcogenide constituent which may be a metal, a metal oxide, or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide.

Carbonaceous active materials are preferably prepared from carbon and fluorine, which includes graphitic and non-graphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein n refers to the number of monomer units which can vary widely.

The metal oxide or the mixed metal oxide is produced by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIIB, VIIB and VIII, which include the noble metals and/or other oxide and sulfide compounds. A preferred cathode active material is a reaction product of at least silver and vanadium.

One preferred mixed metal oxide useful in primary cell cathodes is a transition metal oxide having the general formula $SM_xV_2O_y$, where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$, in any one of its many phases, i.e., β-phase silver vanadium oxide having in the general formula x=0.35 and y=5.8, γ-phase silver vanadium oxide having in the general formula x=0.80, y=5.40 and s-phase silver vanadium oxide having in the general formula x=1.0 and y=5.5, and combination and mixtures of phases thereof. For a more detailed description of such cathode active materials reference is made to U.S. Pat. No. 4,310,609 to Liang et al. This patent is assigned to the assignee of the present invention and incorporated herein by reference.

Another preferred composite transition metal oxide cathode material includes $V_2O_z$ wherein $z \leq 5$ combined with $Ag_2O$ having silver in either the silver(II), silver(I) or silver (0) oxidation state and CuO with copper in either the copper (II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. Nos. 5,472,810 and 5,516,340, both to Takeuchi et al. These patents are assigned to the assignee of the present invention and incorporated herein by reference.

In addition to the previously described fluorinated carbon, silver vanadium oxide and copper silver vanadium oxide, $Ag_2O$, $Ag_2O_2$, $CuF_2$, $Ag_2CrO_4$, $MnO_2$, $V_2O_5$, $MnO_2$, $TiS_2$, $Cu_2S$, FeS, $FeS_2$, copper oxide, copper vanadium oxide, and mixtures thereof are contemplated as useful cathode active materials for primary cells.

In secondary cells, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt, and manganese. The more preferred oxides include $LiNiO_2$, $LiMn_2O_4$, $LiCoO_2$, $LiCO_{0.92}Sn_{0.08}O_2$, and lithium cobalt nickel oxide ($LiCO_{1-x}Ni_xO_2$).

Thus, a typical positive electrode for either a primary or a secondary cell is fabricated by mixing about 85 to about 96 weight percent of the desired cathode active material with about 3 to about 15 weight percent of at least one of the previously described robust, relatively high temperature binders, about 1 to about 5 weight percent of at least one of the previously described sacrificial polymers, and about 1 to about 10 weight percent of at least one of the previously described conductive diluents. The positive electrode admixture is provided on a current collector foil or screen by casting, pressing, rolling or otherwise contacting the admixture thereto. A suitable cathode current collector is selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys. The preferred cathode current collector material is titanium. If $CF_x$ is the active material, the titanium cathode current collector has a thin layer of graphite/carbon paint applied thereto. Less than 3 weight percent of the binder provides insufficient cohesiveness to the loosely agglomerated cathode active materials to prevent delamination and sloughing from the cathode current collector and cracking during electrode preparation, cell fabrication and cell discharge. More than 15 weight percent of the binder provides a cell with diminished capacity and reduced current density due to lowered electrode active density.

Whether the electrode is of a primary or a secondary chemistry, once the electrode active admixture is contacted to the cathode current collector it is first pressed into intimate contact with its current collector and then heated to a temperature to, for all intents and purposes, decompose the sacrificial polymer. The decomposition temperature is about 220° C. for the previously described poly(ethylene carbonate) and about 250° C. for poly(propylene carbonate). Therefore, the minimum final heating temperature must exceed these temperatures to ensure complete combustion of the sacrificial polymer into non-toxic by-products, primarily carbon dioxide and water. This means that for a poly(alkylene carbonate), a heating protocol of about 225° C. to about 275° C. for a period of about 30 minutes to about 2 hours is acceptable. A more preferred protocol is to heat the electrode at about 260° C. for about 1 hour. After heating to decompose the sacrificial polymer, the cathode is ramped down or cooled to ambient temperature, maintained at the decomposition temperature to enhanced bonding strength, or varied according to a specific profile. In general, it is preferred to conduct the heating steps while contacting the cathode current collector with air or an oxygen-containing gas.

In one embodiment, the cathode active mixture contacted to the current collector, but now devoid of the sacrificial polymer, is ready for incorporation into an electrochemical cell. The pore spaces created by decomposition of the sacrificial polymer serve to enhance power capability of the resulting cell. That is because the pores enhance intercalation of lithium ions into the cathode active material, especially at interior regions of the electrode.

In another embodiment, the cathode active mixture contacted to the current collector, but now devoid of the sacrificial polymer, is further calendared or otherwise compressed into a binding intimate contact with the cathode current collector. This pressing is at a significantly greater pressure than that used to first contact the cathode active admixture to the current collector. A pressure of about 20 tons/inch$^2$ to about 45 tons/inch$^2$, preferably about 40 tons/inch$^2$, is typical. This serves to compress the cathode active material into a more densely compacted mass than is possible by manufacturing techniques known in the prior art. It is believed that when the sacrificial polymer is decomposed, it leaves behind void spaces in the active mass. Upon subsequent pressing, these void spaces serve as sights where the active mixture collapses into a more densely compressed mass. While one must be careful not to compress the active mixture so much that it becomes difficult for electrolyte to wet interior positions of the electrode, which is requires for an electrochemical reaction to take place, it is believe that for metal-containing active materials such as SVO, CSVO and the other ones described herein, whether generally know for use in a primary or a secondary system, such pressures are sufficient to provide an electrode with improved energy density. Carbonaceous active materials such as those employed in a secondary anode or the commonly used $CF_x$ primary cathode active material should not be subjected to such high pressures. When they are, carbonaceous active materials tend to collapse into denser masses than metal-containing active materials. In any event, the result is a cathode with enhanced capacity in terms of a similar one that has not been subjected to a secondary pressing step.

To charge secondary cells, lithium ions comprising the positive electrode are intercalated into the carbonaceous negative electrode by applying an externally generated electrical potential to the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging between 0.1 and 1.0. The cell is then provided with an electrical potential and is discharged in a normal manner.

An alternate secondary cell construction comprises intercalating the carbonaceous material with the active lithium material before the negative electrode is incorporated into the cell. In this case, the positive electrode body can be solid and comprise, but not be limited to, such active materials as manganese dioxide, silver vanadium oxide, titanium disulfide, copper oxide, copper sulfide, iron sulfide, iron disulfide and fluorinated carbon. However, this approach is compromised by problems associated with handling lithiated carbon outside of the cell. Lithiated carbon tends to react when contacted by air or water.

In one embodiment, the cathode for a primary cell has silver vanadium oxide contacted to both sides of the cathode current collector. In another embodiment, the cathode has a sandwich design as described in U.S. Pat. No. 6,551,747 to Gan. This patent is assigned to the assignee of the present invention and incorporated herein by reference.

The sandwich cathode design comprises a first active material of a relatively low energy density but a relatively high rate capability in comparison to a second cathode active material. A preferred first cathode active material having a greater rate capability, but a lesser energy density is of a mixed metal oxide such as SVO or CSVO. After removal of the sacrificial polymer, this material is typically provided in a formulation of, by weight, about 94% SVO and/or CSVO, 3% binder and 3% conductive diluent as the formulation facing the anode. The second active material which may be in contact with the other side of the current collector is, for example, $CF_x$. After removal of the sacrificial polymer, this material is preferably provided in an active formulation having, by weight, about 91% $CF_x$, 5% binder and 4% conductive diluent.

In a broader sense, the first active material of a sandwich cathode design is any material which has a relatively lower energy density but a relatively higher rate capability than the second active material. In addition to silver vanadium oxide and copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, copper oxide, copper vanadium oxide, and mixtures thereof are useful as the first active material, and in addition to fluorinated carbon, $Ag_2O$, $Ag_2O_2$, $CuF_2$, $Ag_2CrO_4$, $MnO_2$ and even SVO itself are useful as the second active material.

One exemplary sandwich cathode has the following configuration: silver vanadium oxide/current collector/$CF_x$/current collector/silver vanadium oxide.

Another exemplary sandwich cathode electrode configuration is: silver vanadium oxide/current collector/silver vanadium oxide/$CF_x$/silver vanadium oxide/current collector/silver vanadium oxide.

Still another configuration for an electrochemical cell with a sandwich electrode has a lithium anode and a cathode configuration of: silver vanadium oxide/current collector/$CF_x$, with the silver vanadium oxide facing the lithium anode.

In order to prevent internal short circuit conditions, the cathode is separated from the anode by a suitable separator material. The separator material may be formed as a pouch or bag that individually encloses the anode, cathode, or both. The separator material is electrically insulative, and also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell.

Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.), and a membrane commercially available under the designation TONEN®.

The electrochemical cell further includes a nonaqueous, ionically conductive electrolyte which serves as a medium for migration of ions between the anode and the cathode during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable lithium salt dissolved in a mixture of aprotic organic solvents comprising a low viscosity solvent and a high permittivity solvent. The inorganic, ionically conductive salt serves as the vehicle for migration of the lithium ions to intercalate or react with the cathode active materials. Known lithium salts that are useful as a vehicle for transport of lithium ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful in formulating the electrolyte include esters, linear and cyclic ethers and dialkyl carbonates such as tetrahydrofuran, methyl acetate, diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate (EMC), methyl propyl carbonate, ethyl propyl carbonate, diethyl carbonate (DEC), dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone, N-methylpyrrolidinone, and mixtures thereof. In the present invention, the preferred electrolyte for a primary lithium cell is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

A preferred electrolyte for a secondary cell of an exemplary carbon/$LiCoO_2$ couple comprises a solvent mixture of EC:DMC:EMC:DEC. Most preferred volume percent ranges for the various carbonate solvents include EC in the range of about 20% to about 50%; DMC in the range of about 12% to about 75%; EMC in the range of about 5% to about 45%; and DEC in the range of about 3% to about 45%. In a preferred form, the electrolyte activating the cell is at equilibrium with respect to the ratio of DMC:EMC:DEC. This is important to maintain consistent and reliable cycling characteristics. It is known that due to the presence of low-potential (anode) materials in a charged cell, an un-equilibrated mixture of DMC:DEC in the presence of lithiated graphite ($LiC_6 \approx 0.01$ V vs $Li/Li^+$) results in a substantial amount of EMC being formed. When the concentrations of DMC, DEC and EMC change, the cell's cycling characteristics and temperature rating also change. Such unpredictability is unacceptable. This phenomenon is described in detail in U.S. Pat. No. 6,746,804 to Gan et al., which is assigned to the assignee of the present invention and incorporated herein by reference. Electrolytes containing such a quaternary carbonate mixture exhibit freezing points below −50° C., and lithium ion secondary cells activated with such mixtures have very good cycling behavior at room temperature as well as very good discharge and charge/discharge cycling behavior at temperatures below −40° C.

The anode and cathode may be in the form of one or more plates operatively associated with each other, or the cathode may be in the form of a strip wound with a corresponding strip of anode material in a structure similar to a "jellyroll". The negative electrode is preferably on the outside of the electrode assembly to make electrical contact with the case in a case-negative configuration. Using suitable top and bottom insulators, the electrode assembly is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The above assembly describes a case-negative cell, which is the preferred construction of either the exemplary primary or secondary cell of the present invention. As is well known to those skilled in the art, the exemplary primary and secondary electrochemical systems can also be constructed in case-positive configuration.

It is appreciated that various modifications to the present inventive concepts described herein may be apparent to those of ordinary skill in the art without disporting from the spirit and scope of the present invention as defined by the herein appended claims.

What is claimed is:

1. An electrochemical cell, which comprises:
   a) a conductive casing;
   b) an anode comprising an anode active mixture comprising an anode active material and an anode binder contacted to an anode current collector;
   c) a cathode comprising a cathode active mixture comprising a cathode active material and a cathode binder contacted to a cathode current collector;
   d) wherein at least one of the anode active mixture and the cathode active mixture is characterized as consisting essentially of the presence of pore spaces provided by substantially complete combustion of a sacrificial polymer that had been mixed therewith prior to the anode or the cathode active mixture having been heated to a temperature sufficient to decompose the sacrificial polymer, leaving behind a residual carbon in a quantity of about 6.9 ppm per ASTM D482 of a beginning amount of the sacrificial polymer present in the anode or the cathode active mixture;
   e) a separator disposed between the anode and the cathode to prevent direct physical contact between them housed inside the casing; and
   f) an electrolyte activating the cathode and the anode.

2. The electrochemical cell of claim 1 wherein the sacrificial polymer is selected from the group consisting of ethyl cellulose, acrylic resin, polyvinyl alcohol, polyvinyl butyral, a poly(alkylene carbonate) having the general formula R—O—C(=O)—O with R=C1 to C5, and mixtures thereof.

3. The electrochemical cell of claim 1 wherein the binder is selected from the group consisting of polyethylene, polypropylene, a polyamide, a polyimide, fluorinated ethylene, fluorinated propylene, polyvinylidene fluoride, polytetrafluoroethylene, polyethylenetetrafluoroethylene, polyhexafluoropropylene, tetrafluoroethylene-hexafluoropropylene copolymers, tetrafluoroethylene-perfluoroalkyl vinyl ether copolymers, polytrifluoroethylene, ethylene-tetrafluoroethylene copolymers, fluoroethylene-hydrocarbon vinyl ether copolymers, polychlorotrifluoroethylene, ethylene-chlorotrifluoroethylene copolymers, polyvinyl fluoride, vinylidene fluoride-hexafluoropropylene copolymers, fluorinated (meth)acrylate resins, 2-fluoroacrylate resins, fluorinated epoxy resins, fluorinated epoxy (meth)acrylate resins, fluorinated polyether resins, fluorinated polyimide resins, fluorinated polyester resins, fluorinated polyamide resins, fluorinated polycarbonate resins, fluorinated polyformal resins, fluorinated polyketone resins, fluorinated polyazomethine resins, fluorinated polyazole resins, fluorinated polyallyloxysilane resins, vinylidene fluoride-hexafluoropropylene fluoroelastomer, vinylidene fluoride-tetrafluoroethylene fluoroelastomer, tetrafluoroethylene-perfluoroalkyl vinyl ether fluoroelastomer, vinylidene fluoride-tetrafluoroethylenehexafluoropropylene fluoroelastomer, vinylidene fluoride-tetrafluoroethylene-perfluoroalkyl vinyl ether fluoroelastomer, tetrafluoroethylene-perfluoroalkyl vinyl ether fluoroelastomer, propylene-tetrafluoroethylene fluoroelastomer, fluorosilicone rubber, fluorinated phosphazene rubber, fluorinated thermoplastic rubbers, natural rubber, and mixtures thereof.

4. The electrochemical cell of claim 1 wherein the anode active material is selected from the group consisting of coke, graphite, acetylene black, carbon black, glassy carbon, meso-carbon micro beads, and mixtures thereof.

5. The electrochemical cell of claim 1 wherein the anode active material, the binder and the residual carbon are characterized as having been compressed onto the anode current collector under a pressure of about 5 tons/inch$^2$ to about 65 tons/inch$^2$.

6. The electrochemical cell of claim 1 wherein the cathode active material, the binder and the residual carbon are characterized as having been compressed onto the cathode current collector under a pressure of about 20 tons/inch$^2$ to about 45 tons/inch$^2$.

7. A method of making an electrochemical cell, comprising the steps of
   a) providing a conductive casing;
   b) contacting an anode active material to an anode current collector to provide an anode;
   c) contacting a cathode active material to a cathode current collector to provide a cathode;
   d) wherein at least one of the anode active material and the cathode active material is mixed with a binder and a sacrificial polymer;
   e) heating the at least one of the anode active material and the cathode active material mixture to decompose the sacrificial polymer into a product residual carbon;
   f) disposing a separator between the anode and the cathode to prevent direct physical contact between them housed inside the casing; and
   g) activating the cathode and the anode with an electrolyte.

8. The method of claim 7 including selecting the sacrificial polymer from the group consisting of ethyl cellulose, acrylic resin, polyvinyl alcohol, polyvinyl butyral, a poly(alkylene carbonate) having the general formula R—O—C(=O)—O with R=C1 to C5, and mixtures thereof.

9. The method of claim 7 including selecting the sacrificial polymer from either poly(ethylene carbonate) or polypropylene carbonate).

10. The method of claim 7 wherein the residual carbon is about 6.9 ppm per ASTM D482 of the sacrificial polymer.

11. The method of claim 7 including providing the binder as a powdered thermoplastic polymeric material.

12. The method of claim 7 including selecting the binder from the group consisting of polyethylene, polypropylene, a polyamide, a polyimide, fluorinated ethylene, fluorinated propylene, polyvinylidene fluoride, polytetrafluoroethylene, polyethylenetetrafluoroethylene, polyhexafluoropropylene, tetrafluoroethylene-hexafluoropropylene copolymers, tetrafluoroethylene-perfluoroalkyl vinyl ether copolymers, polytrifluoroethylene, ethylene-tetrafluoroethylene copolymers, fluoroethylene-hydrocarbon vinyl ether copolymers, polychlorotrifluoroethylene, ethylene-chlorotrifluoroethylene copolymers, polyvinyl fluoride, vinylidene fluoride-hexafluoropropylene copolymers, fluorinated (meth)acrylate resins, 2-fluoroacrylate resins, fluorinated epoxy resins, fluorinated epoxy (meth)acrylate resins, fluorinated polyether resins, fluorinated polyimide resins, fluorinated polyester resins, fluorinated polyamide resins, fluorinated polycarbonate resins, fluorinated polyformal resins, fluorinated polyketone resins, fluorinated polyazomethine resins, fluorinated polyazole resins, fluorinated polyallyloxysilane resins, vinylidene fluoride-hexafluoropropylene fluoroelastomer, vinylidene fluoride-tetrafluoroethylene fluoroelastomer, tetrafluoroethylene-perfluoroalkyl vinyl ether fluoroelastomer, vinylidene fluoride-tetrafluoroethylenehexafluoropropylene fluoroelastomer, vinylidene fluoride-tetrafluoroethylene-perfluoroalkyl vinyl ether fluoroelastomer, tetrafluoroethylene-perfluoroalkyl vinyl ether fluoroelastomer, propylene-tetrafluoroethylene fluoroelastomer, fluorosilicone rubber, fluorinated phosphazene rubber, fluorinated thermoplastic rubbers, natural rubber, and mixtures thereof.

13. The method of claim 7 including decomposing the sacrificial polymer in either an inert or an oxidizing atmosphere to provide the residual carbon.

14. The method of claim 7 including decomposing the sacrificial polymer in an atmosphere selected from the group consisting of a vacuum, nitrogen, hydrogen, argon, helium, air, oxygen, and steam to provide the residual carbon.

15. The method of claim 7 including heating the at least one of the anode active material and the cathode active material mixture at a temperature above a first decomposition temperature of the sacrificial polymer but below a second decomposition temperature of the binder.

16. The method of claim 7 including heating the at least one of the anode active material and the cathode active material mixture at a temperature of about 220° C. to about 350° C. to decompose the sacrificial polymer into the product residual carbon.

17. The method of claim 7 including selecting the anode active material from the group consisting of coke, graphite, acetylene black, carbon black, glassy carbon, meso-carbon micro beads, and mixtures thereof.

18. The method of claim 7 including compressing the anode active material, the binder and the residual carbon onto the anode current collector under a pressure of about 5 tons/inch$^2$ to about 65 tons/inch$^2$.

19. The method of claim 7 including selecting the cathode active material from the group consisting of silver vanadium oxide, copper silver vanadium oxide, copper oxide, copper vanadium oxide, $V_2O_5$, $MnO_2$, $LiCoO_2$, $LiNiO_2$, $LiMn_2O_4$, $TiS_2$, $Cu_2S$, $FeS$, $FeS_2$, $Ag_2O$, $Ag_2O_2$, $CuF_2$, $Ag_2CrO_4$, and mixtures thereof.

20. The method of claim 7 including pressing the cathode active material, the binder and the residual carbon onto the cathode current collector under a pressure of about 20 tons/inch$^2$ to about 45 tons/inch$^2$.

21. The method of claim 7 including providing a conductive diluent with at least one of the anode active material and the cathode active material.

22. A method of making an electrochemical cell, comprising the steps of:

a) providing a conductive casing;
b) contacting lithium to an anode current collector to provide an anode;
c) contacting silver vanadium oxide to a first side of a cathode current collector and fluorinated carbon to a second side thereof to provide a cathode;
d) wherein at least one of the silver vanadium oxide and the fluorinated carbon is mixed with a binder and a sacrificial polymer;
e) heating the cathode to decompose the sacrificial polymer into a product residual carbon;
f) disposing a separator between the anode and the cathode to prevent direct physical contact between them housed inside the casing; and
g) activating the cathode and the anode with an electrolyte.

23. The method of claim 22 including selecting the sacrificial polymer from the group consisting of ethyl cellulose, acrylic resin, polyvinyl alcohol, polyvinyl butyral, a poly (alkylene carbonate) having the general formula R—O—C(=O)—O with R=C1 to C5, and mixtures thereof.

24. The method of claim 22 wherein the residual carbon is about 6.9 ppm per ASTM D482 of the sacrificial polymer.

25. The method of claim 22 including selecting the binder from the group consisting of polyethylene, polypropylene, a polyamide, a polyimide, fluorinated ethylene, fluorinated propylene, polyvinylidene fluoride, polytetrafluoroethylene, polyethylenetetrafluoroethylene, polyhexafluoropropylene, tetrafluoroethylene-hexafluoropropylene copolymers, tetrafluoroethylene-perfluoroalkyl vinyl ether copolymers, polytrifluoroethylene, ethylene-tetrafluoroethylene copolymers, fluoroethylene-hydrocarbon vinyl ether copolymers, polychlorotrifluoroethylene, ethylene-chlorotrifluoroethylene copolymers, polyvinyl fluoride, vinylidene fluoride-hexafluoropropylene copolymers, fluorinated (meth)acrylate resins, 2-fluoroacrylate resins, fluorinated epoxy resins, fluorinated epoxy (meth)acrylate resins, fluorinated polyether resins, fluorinated polyimide resins, fluorinated polyester resins, fluorinated polyamide resins, fluorinated polycarbonate resins, fluorinated polyformal resins, fluorinated polyketone resins, fluorinated polyazomethine resins, fluorinated polyazole resins, fluorinated polyallyloxysilane resins, vinylidene fluoride-hexafluoropropylene fluoroelastomer, vinylidene fluoride-tetrafluoroethylene fluoroelastomer, tetrafluoroethylene-perfluoroalkyl vinyl ether fluoroelastomer, vinylidene fluoride-tetrafluoroethylenehexafluoropropylene fluoroelastomer, vinylidene fluoride-tetrafluoroethylene-perfluoroalkyl vinyl ether fluoroelastomer, tetrafluoroethylene-perfluoroalkyl vinyl ether fluoroelastomer, propylene-tetrafluoroethylene fluoroelastomer, fluorosilicone rubber, fluorinated phosphazene rubber, fluorinated thermoplastic rubbers, natural rubber, and mixtures thereof.

26. The method of claim 22 including decomposing the sacrificial polymer in either an inert or an oxidizing atmosphere to provide the residual carbon.

27. The method of claim 22 including heating the cathode at a temperature above a first decomposition temperature of the sacrificial polymer but below a second decomposition temperature of the binder.

28. The method of claim 22 including heating the cathode at a temperature of about 220° C. to about 350° C. to decompose the sacrificial polymer into the product residual carbon.

29. The method of claim 22 including compressing the silver vanadium oxide and the fluorinated carbon onto the cathode current collector under a pressure of about 20 tons/inch$^2$ to about 45 tons/inch$^2$.

* * * * *